United States Patent
Lem et al.

(10) Patent No.: US 10,107,638 B2
(45) Date of Patent: Oct. 23, 2018

(54) VEHICLE SEAT WITH SYSTEM AND METHOD FOR COMMUNICATING NAVIGATION INSTRUCTIONS

(71) Applicant: Ford Global Technologies, LLC, Dearborn, MI (US)

(72) Inventors: Jeroen Lem, Maastricht (NL); Yifan Chen, Ann Arbor, MI (US); Abhishek Sharma, Novi, MI (US); Brian Boland, Pinckney, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/370,503

(22) Filed: Dec. 6, 2016

(65) Prior Publication Data
US 2018/0156629 A1    Jun. 7, 2018

(51) Int. Cl.
*G01C 21/36* (2006.01)
*B60N 2/90* (2018.01)

(52) U.S. Cl.
CPC ......... *G01C 21/3626* (2013.01); *B60N 2/914* (2018.02); *B60N 2/976* (2018.02); *G01C 21/3667* (2013.01)

(58) Field of Classification Search
CPC ............ G01C 21/3626; G01C 21/3667; G01C 21/3652; B60N 2/4415; B60N 2/448
See application file for complete search history.

(56) References Cited

U.S. PATENT DOCUMENTS

| | | | |
|---|---|---|---|
| 9,827,811 B1* | 11/2017 | McNew | B60N 2/90 |
| 2010/0280713 A1 | 11/2010 | Stählin et al. | |
| 2010/0288072 A1 | 11/2010 | Springer et al. | |
| 2011/0199200 A1 | 8/2011 | Lueke et al. | |
| 2012/0081234 A1 | 4/2012 | Shaffer et al. | |
| 2012/0287262 A1* | 11/2012 | Nakayama | B60K 35/00 348/113 |
| 2013/0226408 A1 | 8/2013 | Fung et al. | |
| 2014/0142851 A1* | 5/2014 | Larmo | G01C 21/3652 701/538 |
| 2015/0197283 A1* | 7/2015 | Marti | B62D 15/029 701/41 |
| 2015/0277754 A1* | 10/2015 | Misch | B60N 2/448 715/769 |
| 2015/0351692 A1* | 12/2015 | Pereny | A61B 5/486 297/217.3 |
| 2016/0370863 A1* | 12/2016 | Jones | G06F 3/016 |
| 2017/0043681 A1* | 2/2017 | Seiller | B60N 2/0244 |

* cited by examiner

*Primary Examiner* — Aaron L Troost
(74) *Attorney, Agent, or Firm* — Vichit Chea; Price Heneveld LLP

(57) ABSTRACT

A vehicle includes a navigation system outputting at least one route guidance instruction and a vehicle seat having a plurality of inflatable bladders therein and an inflation assembly for selectively inflating and deflating the bladders independently. A controller is in communication with the navigation system and with the vehicle seat to cause the inflation assembly to inflate and deflate selected ones of the bladders to indicate a component of the at least one route guidance instruction.

11 Claims, 9 Drawing Sheets

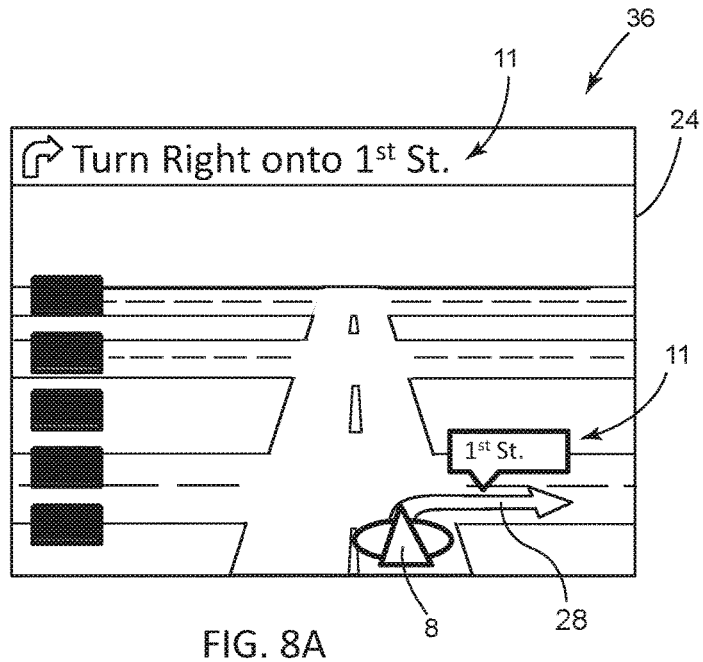
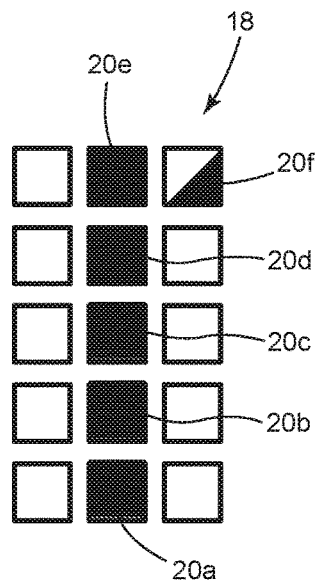
FIG. 8A　　　　　　　FIG. 8B
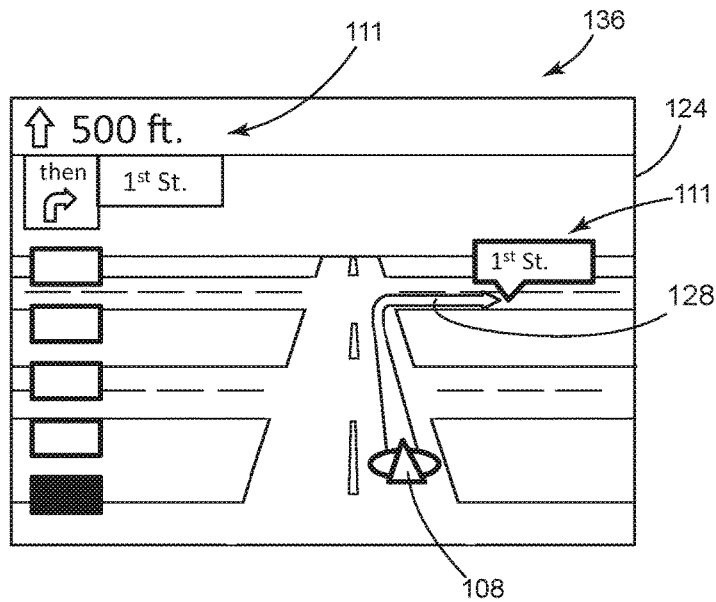
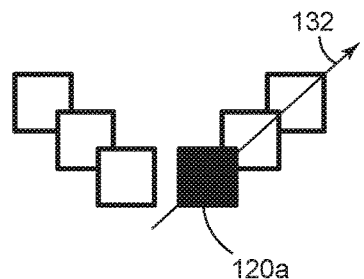
FIG. 9A　　　　　　　FIG. 9B

US 10,107,638 B2

VEHICLE SEAT WITH SYSTEM AND METHOD FOR COMMUNICATING NAVIGATION INSTRUCTIONS

FIELD OF THE INVENTION

The present invention generally relates to a vehicle having a navigation system and a seat configured to act as a communication aid for the navigation system. In particular, various bladders in the seat may be selectively inflated and deflated to indicate a characteristic of a navigation instruction.

BACKGROUND OF THE INVENTION

Navigation systems are generally configured to receive an input of a desired destination from a user, to locate that destination on map information either stored in local memory or accessible from remote memory using a wireless connection and to algorithmically determine a route to the destination using roadway information locally stored or otherwise accessible. The route is then output as an overlay of a line of multiple segments, if necessary, that can be overlaid on an image of the map itself, as well as a set of turn-by-turn route guidance instructions. Accordingly, a driver of a vehicle including navigation functionality, either as a stand-alone system or integrated into a vehicle infotainment system, can control vehicle to maintain it along the indicated path, can follow the turn-by-turn instructions, or some combination of the two to result in the vehicle reaching the desired destination.

The turn-by-turn instructions are typically communicated typographically or by voice commands output by the vehicle's speaker system. Often, listening for verbal instructions from navigation system is the least distracting of previously-available means of receiving route guidance instructions, as it does not require the driver to direct his or her view from the road. However, road noise, speaker volume level, or conversation can make it difficult for the driver to consistently accurately receive the verbal instructions, often requiring confirmation or receipt using the typographical output. Accordingly, further non-verbal and non-typographical communication systems may be helpful to drivers in using a vehicle navigation system.

SUMMARY OF THE INVENTION

According to one aspect of the present disclosure, a vehicle includes a navigation system outputting at least one route guidance instruction and a vehicle seat having a plurality of inflatable bladders therein and an inflation assembly for selectively inflating and deflating the bladders independently. A controller is in communication with the navigation system and with the vehicle seat to cause the inflation assembly to inflate and deflate selected ones of the bladders to indicate a component of the at least one route guidance instruction.

According to another aspect of the present disclosure, a vehicle includes a seat, a pressure transducer positioned within a portion of the vehicle seat, and a human-machine interface including a display screen within an interior of the vehicle. The human-machine interface presents at least one selectable option on the display screen and is in communication with the pressure transducer to receive a pressure signal therefrom and to interpret the signal as a selection of the selectable option.

According to another aspect of the present disclosure, a method for providing navigation information in a vehicle includes determining at least one route guidance instruction using navigation data and causing inflation and deflation of selected ones of a plurality of inflatable bladders in a vehicle seat in a sequential manner over a predetermined area to indicate a component of the at least one route guidance instruction.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8A is a further example depiction of the screen of FIG. 6A providing the route guidance instruction with a further change to one component thereof;

FIG. 8B is a schematic depiction of a subsequent step of the sequence for providing information regarding a component of the route guidance instruction of FIG. 6B, including the addition a further sequence to provide information regarding another component of the route guidance instruction;

FIG. 9A is another example depiction of a screen included in a vehicle human-machine interface providing a route guidance instruction for navigating the vehicle;

FIG. 9B is a schematic depiction of a first step of an alternative sequence for providing information regarding multiple component of the route guidance instruction using an alternative matrix of inflatable bladders within a vehicle seat;

DETAILED DESCRIPTION OF THE PREFERRED EMBODIMENTS

Figure 1:
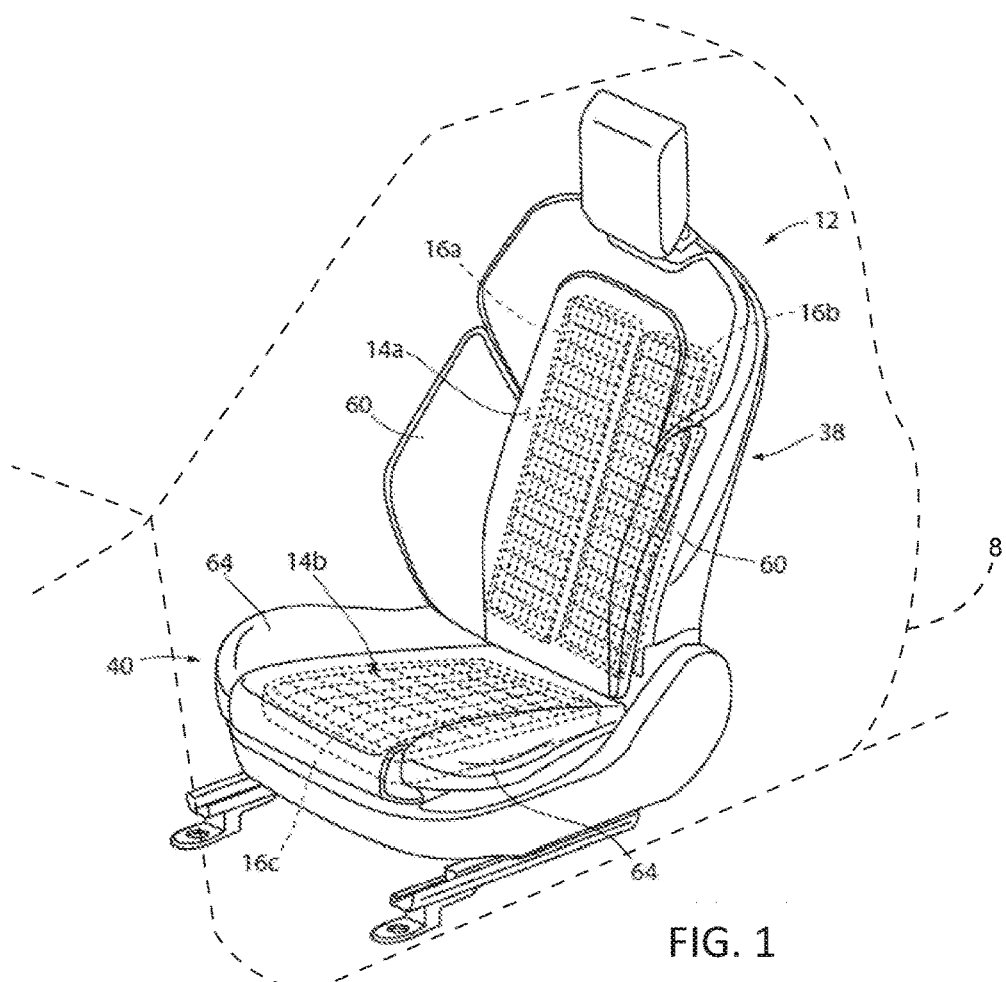
FIG. 1 is a perspective view of a seat within a vehicle according to an aspect of the disclosure.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical components relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Figure 2:
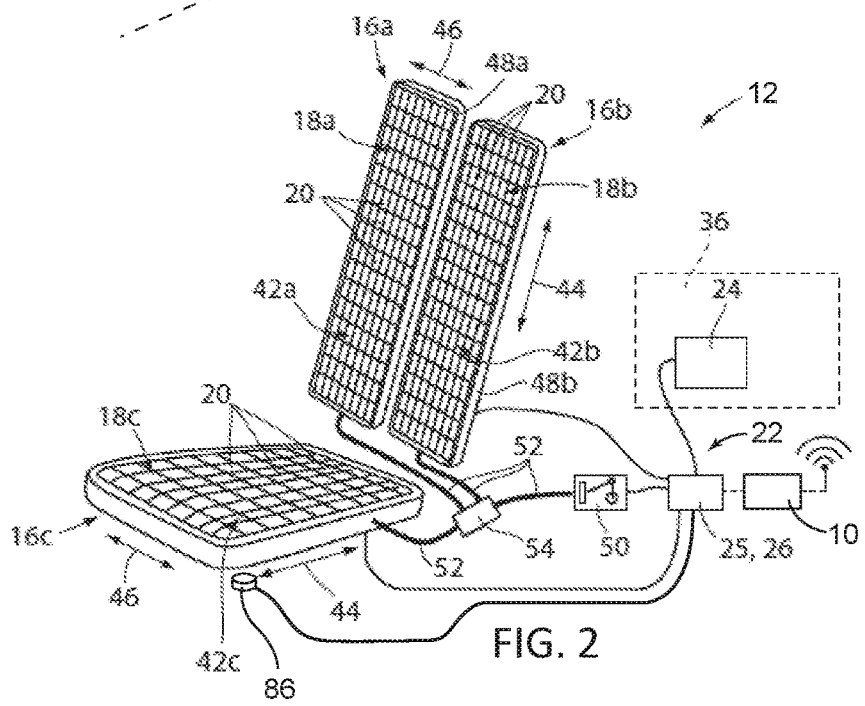
FIG. 2 is a perspective view of an arrangement of bladders that can be positioned within the seat of FIG. 1 and shown schematically coupled with an inflation assembly controllable by a controller to provide navigation information or implement a massage sequence.
Figure 6A:
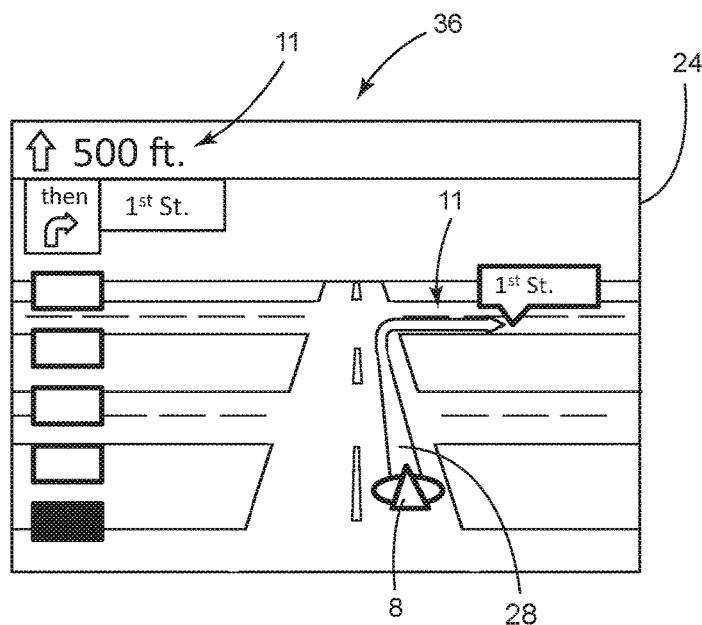
FIG. 6A is an example depiction of a screen included in a vehicle human-machine interface providing a route guidance instruction for navigating the vehicle.

Referring to FIGS. 1 and 2, reference numeral 8 generally designates a vehicle that includes a navigation system 10 outputting at least one route guidance instruction 11 (FIG. 6A). It is noted that what is referred to herein as a "navigation system" can be any system within or associated with vehicle 8 that includes navigation functionality as discussed herein. In particular, such a navigation system can include, by way of example, a stand-alone navigation system or a vehicle "infotainment" system that includes navigation functionality and/or components and circuitry as a feature thereof. Vehicle 8 further includes a seat 12 having a plurality of inflatable bladders 20 therein and an inflation assembly 22 for selectively inflating and deflating respective ones of the bladders 20. A controller 26 is in communication with the navigation system 10 and with the vehicle seat 12 to cause the inflation assembly 22 to inflate and deflate selected ones of the bladders 20 to indicate a component of the at least one route guidance instruction 11 (FIG. 6A).

In the example seat 12 shown in FIGS. 1 and 2, as well as in other variations or implementations of system 10, the inflatable bladders 20 can be included in at least one of various massage assemblies 16a. These massage assemblies, referred to generally as massage assemblies 16, can be positioned within a seatback 38 associated with seat 12 such that the massage assemblies 16a and/or 16b positioned therein can contact respective locations of a back of an occupant. As shown in FIGS. 1 and 2, additional massage units 16c can be positioned within an adjacent cushion 40 with which seatback 38 is coupled. More specifically, each individual massage assembly 16 can have associated therewith a respective bladder matrix 18 including an array 42 of bladders 20, each of such bladders 20 being individually inflatable and deflatable, extending in a first direction 44 and a second direction 46. The individual bladders 20 can be sized and positioned to be close enough together so that sequential inflation and deflation of bladders 20 in one of directions 44 and 46 can simulate the movement of a single object beneath surface 14. In this manner, a group of adjacent ones of bladders 20 can similarly be inflated together, with subsequent inflation of adjacent ones of bladders 20 and deflation of opposite ones of bladders 20 simulating movement of a larger object beneath surface 14 in one of directions 44 and 46, or both directions 44 and 46. As shown, a number of bladders 20 can be included in matrix 18 so as to extend over an area of the seat 12. In an embodiment, at least four bladders 20 can extend in first direction 44 and at least 8 bladders 20 can extend in second direction 46, although other arrangements are contemplated. Further, bladder matrix 18 can be of a generally air-impermeable, flexible polymer including by coupling (including by fusing, adhering, or otherwise) a pair of overlying membranes of such material. In this manner, a plurality of seams within matrix 18 can separate the individual inflatable bladders 20 from one another.

In the present example, the above-described inflation assembly 22 can include valve units 48 supporting and in communication with respective massage matrices 18. In particular, valve units 48 can receive air from a pump 50 through respective supply lines 52 in further combination with a supply manifold 54, as needed, all such components being further included in the present inflation assembly 22. Valve units 48 can direct the air received from pump 50 into individual ones of inflatable bladders 20 and can further control deflation of bladders 20 either by venting the air therein to the ambient environment or by drawing air back into valve unit 48. This can be done by individual valves associated with each of the bladders 20. In an example, these valves can be three-way valves that provide positions to allow air in, to vent air, and to hold pressure. Air can be distributed to the valves through either a number of capillaries, for example within valve units 48, that branching off of supply line 52. In this manner, both the valve units 48 (e.g., the individual valves therein) and pump 50 can be communicatively coupled with controller 26 for causing the pump 50 to pressurize system 10, as well as for causing valve unit 48 to cause the above-referenced selective inflation and deflation of bladders 20. An intermediate manifold 54 can distribute the supply of air from pump 50 to individual supply lines 52 coupled with valve units 48.

The above-described controller 26 can be configured to implement massage functionality by controlling the selective inflation and deflation of bladders 20 according to a predetermined massage sequence using inflation assembly 22. In some instances, massage may be the primary function of bladders 20. The associated inflation assembly 22 and controller 26 with the above-described use of selected ones of the bladders 20 to indicate a component of the one route guidance instructions 11 output by navigation system 10 being a secondary application that takes advantage of the presence of bladders 20 and the associated inflation assembly 22 and controller 26 to provide an additional feature for vehicle 8. As such, controller 26 can be configured to receive a series of route guidance instructions 11 from navigation system 10 and to use the information to control inflation and deflation of select ones of bladders 20 to convey at least one component of an immediate or upcoming one of the route guidance instructions 11. Such a navigation-assisting sequence 28 (FIGS. 6B, 7B, and 8B, for example) can be implemented by controller 26 while controller 26 is also implementing a massage sequence by, for example, temporarily interrupting the massage sequence to implement the desired navigation-assisting sequence 28 before resuming the massage sequence. In another example, where the navigation-assisting sequence 28 is implemented over a certain area of seat 12 (such as on one side of seatback 38) controller 26 can remove the bladders 20 within that area from the massage sequence, which continues to be implemented on other bladders 20 that are still "available" within the sequence, while simultaneously implementing the navigation-assisting sequence 28 using the selected, corresponding bladders 20, examples of which are discussed further below.

As shown in FIG. 2, a display screen 24 can be included within, or otherwise dictated by functionality of, a human-machine interface HMI 36 that is also present within of vehicle 8. In an embodiment, the screen 24 can be included within a human-machine interface 36 that is positioned adjacent to the driver's seat 12. In the example shown in FIG. 2, seat 12 may be a front vehicle seat such that screen 24 can be included within the HMI 36 positioned on the front instrument panel of vehicle 8, although other locations are possible. In such an embodiment, the above-described massage functionality can be accessed through a menu of various other functions associated with vehicle 8 available for monitoring and/or control by HMI 36. As shown in FIG. 2, the processor 25 and controller 26 may be directly coupled with one another, including by being within a single unit associated with seat 12 and present within vehicle 8. In a variation, the screen 24 can be a touchscreen that allows the user to select, program, or otherwise assemble the massage sequence through direct interaction therewith. Such a massage system, including various massage sequences that can be implemented with a seat 12 similar to that which is shown in FIGS. 1 and 2 is described more fully in co-pending, commonly-assigned U.S. patent application Ser. No. 15/297,701, the entire disclosure of which is incorporated by reference herein.

Figure 3:
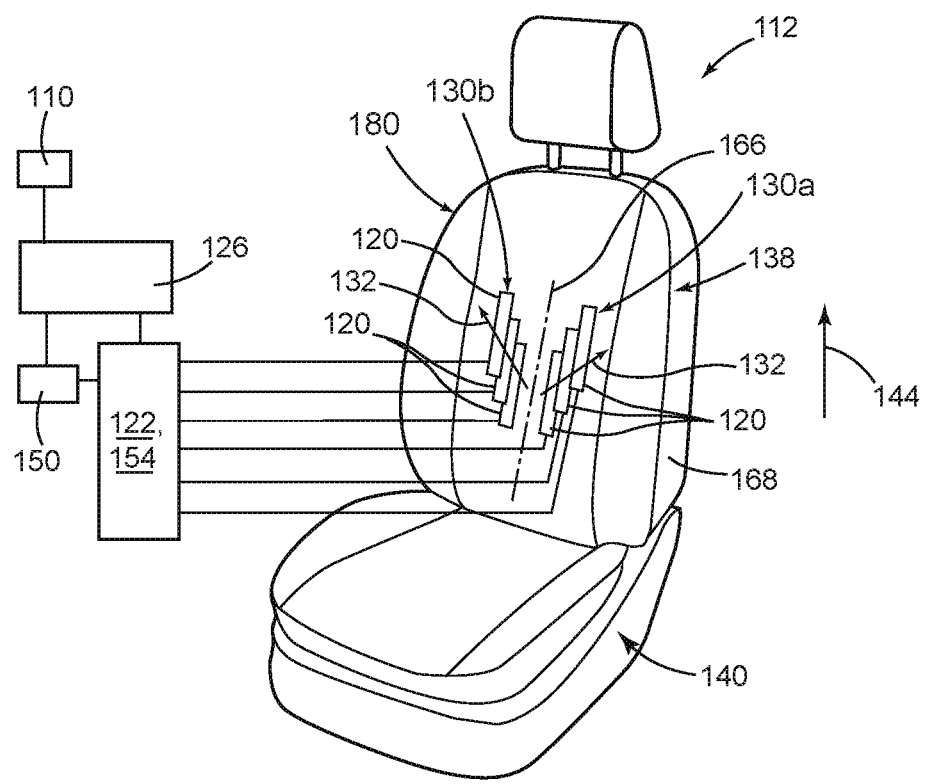
FIG. 3 is a perspective view of an alternative vehicle seat with an alternative arrangement of bladders shown schematically coupled with an inflation assembly controllable by a controller to provide navigation information or implement a massage sequence.
Figure 4:
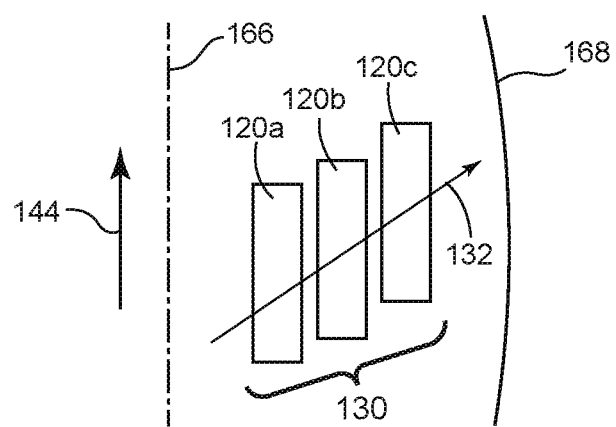
FIG. 4 is a schematic view of the arrangement of bladders of FIG. 3.

In another example shown in FIGS. 3 and 4, vehicle seat 112 includes a first set 120a of bladders 120 (which is illustrated as including three such bladders 120, although more or fewer bladders 120 can be included in any given set) coupled within seatback 138. The bladders 120 of the first set 130 are arranged to extend diagonally (e.g. along diagonal 132) from adjacent a center line 166 of seatback 138 at a first location (e.g. the location corresponding with bladder 120a) toward a first lateral side 168 of seatback 138 at a second location (e.g. a location corresponding to bladder 120c) above the first location. The first set of massage bladders 120 are independently inflatable and deflatable with respect to one another. Additionally or alternatively, further sets of bladders 120 can be located within seat cushion 140.

As shown in FIGS. 3 and 4, in one diagonal arrangement, bladders 120 can be arranged with a first one of such bladders 120a in a first position closest to center line 166 and at a lower most position in vertical direction 144. A second one of such bladders 120b can be in a second position that is farther away from center line 166 and, thus closer to lateral side 168 of seatback 138 and at a relatively higher position along vertical direction 144 as compared to bladder 120a. A still further one of such bladders 120c can be in a third position farther away from center line 166 than both bladder 120a and bladder 120b and at a still higher position along vertical direction 144. As such, bladders 120a, 120b, and 120c can be evenly spaced along diagonal 132, as shown in FIGS. 3 and 4. An opposite set 120b of bladders 120 can extend in a similar manner along diagonal 132 on the opposite side 180 of seatback 138.

It is noted that the bladders 120a-120f in the various sets can have varying relative positions with respect to each other. In the variation shown in FIG. 3, for example, bladders 120a, 120b, and 120c, are shown as being arranged in positions so as to overlap, successively (or sequentially), as they extend along diagonal 132. Alternatively, as shown in FIG. 4, none of bladders 120a-120f are shown as overlapping. The amount and proportions of any such overlapping may depend on a number of factors, including but not limited to the size of bladders 120a, 120b, and 120c as well as the vertical and lateral spacing thereof and the particular body part or location under consideration for the massage. The variation of seat 112 shown in FIGS. 3 and 4 can include a similar arrangement of bladders 120 within cushion 140 that may extend along less of a diagonal and more toward a fore-aft arrangement that may extend somewhat inwardly with movement in the aft direction (i.e. toward seatback 138).

The above-described arrangements can allow for bladders 120 to implement a massage action along certain muscles or groups thereof so as to simulate translational movement (e.g. rubbing) of the muscles along the directions in which the muscles extend. In general, such a simulated translational massage action can be achieved by sequentially inflating and deflating bladders 120a, 120b, and 120c along diagonal 132 in a predetermined scheme. Such a scheme can be implemented simultaneously within the varying sets of bladders 120 or separately, depending on the particular scheme and/or user input and is described further in co-pending, commonly-assigned U.S. patent application Ser. No. 14/616,921, the entire disclosure of which is hereby incorporated by reference herein.

In a similar manner to the variation of seat 12 discussed above, seat 112 depicted in FIGS. 3 and 4 can include an inflation assembly 122 having a pump 150 fluidically coupled with the individual bladders 120 via a valve module 154. In general, valve module 154 is fluidically connected with pump 150, which supplies compressed air thereto. Valve module 154 is then individually connected with the respective massage bladders 120 and, in one example, includes a series of electronically controllable valves (such as solenoid valves or the like) for selectively channeling a flow of compressed air as supplied by pump 150 to selected ones of the massage bladders 120, as needed or desired according to the implemented scheme. In either such example, for implementation of the desired massage scheme, controller 126 is electronically coupled with both pump 150 for activation thereof, and with valve module 154 to implement predetermined control of the internal valves therein in a manner similar to that which is discussed above with respect to FIGS. 1 and 2. Further, controller 126 can be in communication with navigation system 110 to receive route guidance instructions 111 and to inflate and deflate selected ones of bladders 120 in a manner to communicate a component of the navigation instruction, as discussed further below. In one example, controller 126 can be further electrically coupled with a control system of the associated vehicle 8 such that activation thereof, as well as selection of a particular scheme or adjustment of particular parameters can be carried out by the vehicle control system, which in an example, can be the SYNC™ system available from Ford Motor Company of Dearborn, Mich.

Figure 5:
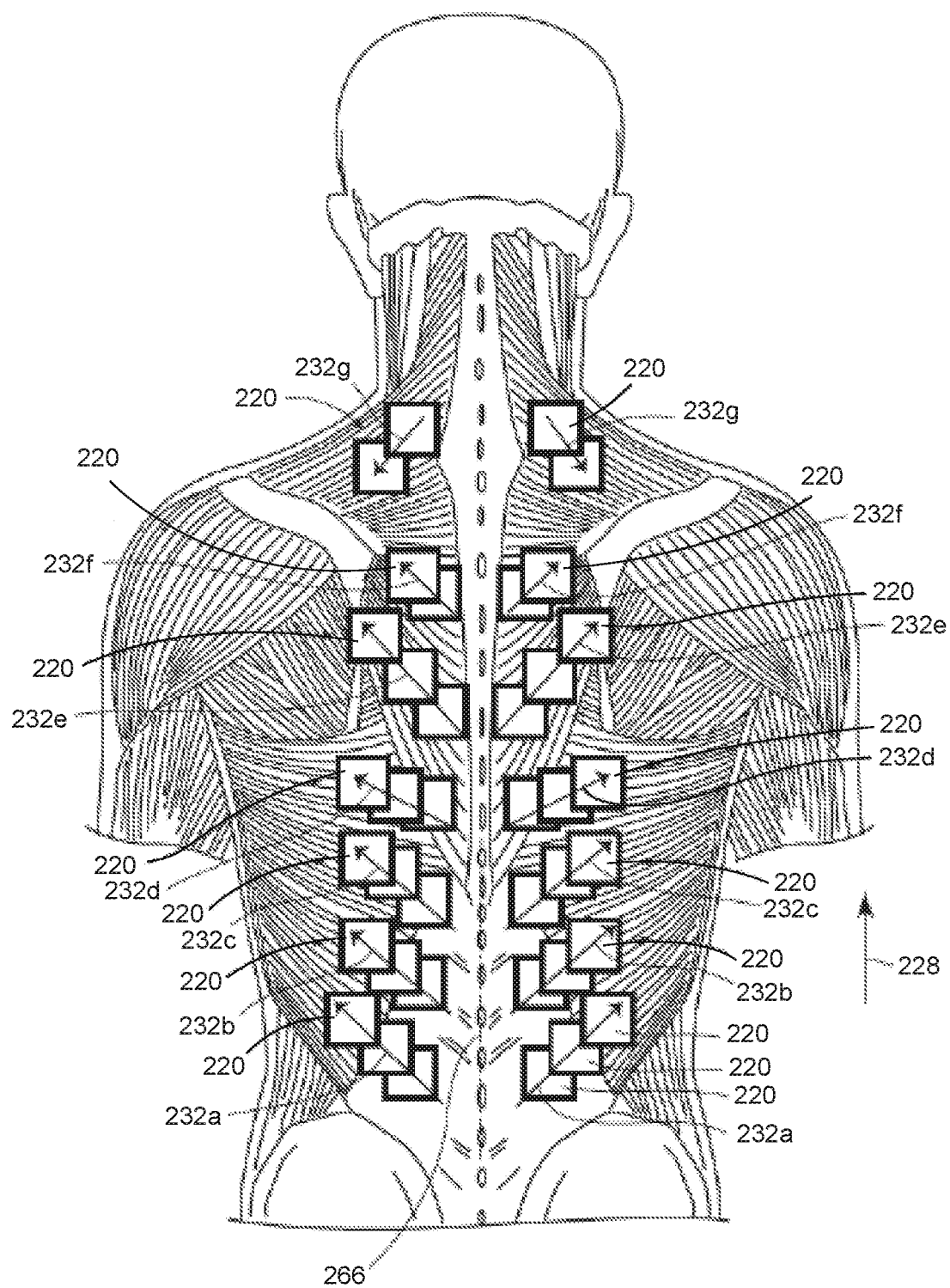
FIG. 5 is a schematic view of an alternative arrangement of bladders that can also be coupled with an inflation assembly controllable by a controller to provide navigation information or implement a massage sequence.

As shown in FIG. 5, a further variation of an arrangement of massage bladders 220 can include a plurality of different sets of bladders 220 that each extend along respective diagonals 232a-232g that are aligned vertically with respect to each other and are individually directed outwardly from center line 266 of the corresponding seatback. Further, bladders 220 can be positioned on opposite sides of center line 266 in a mirror-image arrangement. In such an arrangement, the diagonals 232a-232g, for example, can be positioned to generally correspond with the various muscle groups of the back. In this manner, the various massage bladders 220 can be used to implement different types of massages among different muscle groups or other areas of the back of an occupant O of the seat according to various massage sequences in a similar manner to those discussed above with respect to FIGS. 1 and 2.

As discussed above with respect to FIGS. 1 and 2, various vehicle seats, including the examples of seats 12 and 112, discussed above, as well as other seats with separately-controllable bladders that are aligned in at least one direction that can be discerned by an occupant of the seat, can be used to convey navigation information. As shown in FIGS. 6A-7B, in one example, a set of massage bladders 20 arranged in a matrix 18 can indicate a distance to a turn, the distance to and direction of the turn being included in the above-mentioned route guidance instruction 11 that is output by the navigation system 10. In particular, the navigation system 10 can be configured to receive an input of a desired destination from a user, to locate that destination on map information either stored in local memory or accessible from remote memory using a wireless connection (such as various cellular data connections, Wi-Fi, or the like) and to algorithmically determine a route to the destination using roadway information locally stored or otherwise accessible. The route is then output as an overlay of a line of multiple segments, if necessary, that can be presented on an image of the map itself (as a whole or in sequential portions), as well as a set of turn-by-turn route guidance instructions. Accordingly, a driver of the associated vehicle 8 can control vehicle 8 to maintain it along the indicated path, can follow the turn-by-turn instructions (which are typically communicated typographically or by voice commands output by the vehicle's speaker system), or some combination of the two to result in vehicle 8 reaching the desired destination. Often, listening for verbal instructions from navigation system 10 is the least distracting of previously-available means of receiving route guidance instructions 11, as it does not required the driver to direct his or her view from the road. However, road noise, speaker volume level, or conversation can make it difficult for the driver to consistently accurately receive the verbal instructions, often requiring confirmation or receipt using the typographical output.

Figure 6B:
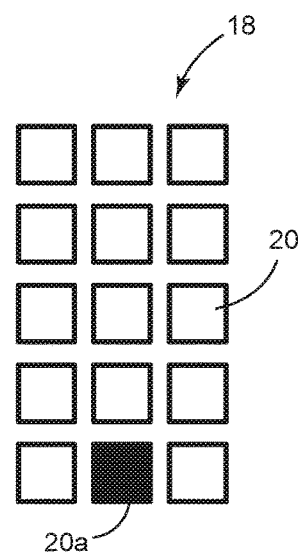
FIG. 6B is a schematic depiction of a first step of a sequence for providing information regarding a component of the route guidance instruction using a matrix of inflatable bladders within a vehicle seat.

By using bladders 20 to communicate one or more components of the route guidance instruction 11, the user can receive confirmation and/or additional information regarding upcoming maneuvers, without needing to hear verbal instructions or deviate his or her view from the road. As shown in FIG. 6A, route guidance instruction 11 can be related to an upcoming turn and can include several components, including the distance to the next maneuver, the nature of the maneuver, which in the illustrated example is a turn, the direction of the maneuver (i.e. to the right), as well as a description of the location where the maneuver is to take place (the name of the street, as shown in the illustrated example, exit numbers, or the like). As shown in FIG. 6B, the matrix 18 of massage bladders 20 can be used to indicate the distance component of the route guidance instruction 11. In particular, the number of bladders extending linearly in the vertical direction 44 can be scaled to the threshold at which navigation system 10 begins to output specific typographical or verbal instructions related to the next route guidance instruction 11.

Figure 7A:
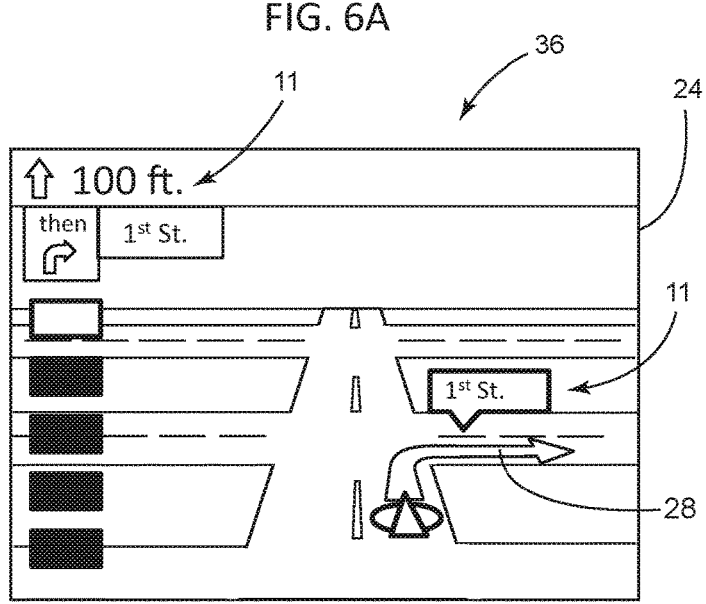
FIG. 7A is an further example depiction of the screen of FIG. 6A providing the route guidance instruction with a change to one component thereof.

As shown, if a verbal indication is given at 500 feet to a turn, for example, and the matrix 18 include five bladders in the first direction 44, controller 26 (FIG. 2), upon receipt of the route guidance instruction 11 (in whole or in relevant part) can inflate one bladder 20 in vertical succession for each 100 feet such that the inflation of the vertically-arranged bladders 20 is proportional to and coordinated with the distance remaining before the turn on which the distance is based and the presentation of the instruction 11 on screen 24. In FIG. 6A, the distance component of route guidance instruction is 500 ft. so in FIG. 6B, a single bladder 20a is shown as being inflated within matrix 18. It is noted that the depicted matrix 18 can be in the cushion 40 or in the seatback 38 of seat 12. For example, if the matrix is in the cushion 40, the view of the matrix depicted in FIG. 6B can be such that the upper-most portion of matrix 18 is directed forward with respect to vehicle 8 (i.e. away from seatback 38). Similarly, if the matrix is in the seatback 38, the view of the matrix depicted in FIG. 6B can be such that the upper-most portion of matrix 18 is directed upward with respect to vehicle 8 (i.e. away from cushion 40). As the vehicle 8 moves incrementally closer to the location of the maneuver, additional ones of bladders 20 vertically above bladder 20a are inflated in succession. In FIG. 7A, the distance to the indicated right turn has decreased to 100 ft., resulting in additional bladders 20b, 20c, and 20d having also been inflated by controller 26 by way of inflation assembly 22, as described above, to indicate that vehicle 8 is closer to the upcoming maneuver. A matrix 18 with more or fewer bladders 20 in vertical direction 44 can be adapted to similarly communicate the distance to a navigation maneuver. In an alternative arrangement, controller 26 can initially inflate bladders 20a-20e, and optionally bladder 20f, to indicate that the turn maneuver if upcoming and then, successively deflate bladders 20a-20e to indicate the portion of the overall distance that has been traveled, until the location of the turn has been reached. Such a scheme can be similarly implemented as an alternative to successive inflation of other bladders in the further examples discussed herein.

As shown in FIGS. 8A and 8B, the matrix 18 of bladders 20 can further be used to indicate the direction of the route guidance instruction 11. As mentioned previously, the route guidance instruction 11 in the example of FIGS. 6A and 7A, as well as FIG. 8A, is a right turn. Accordingly, when the location for execution of the turn has been reached, controller 26 (FIG. 2) can cause a bladder 20 on the corresponding side of matrix 18 to inflate to indicate the direction component of the route guidance instruction 11. As indicated in FIG. 8B, the controller 26 can implement a pulsing inflation of bladder 20f by sequentially inflating and deflating bladder 20f until the turn has been executed. In a variation of the sequence depicted in FIGS. 6A-7B, the direction-indicating bladder 20f, for example, can be pulsed initially along with inflation of the first distance-indicating bladder 20a so that the user can determine that a right turn is upcoming, but not needed immediately. Pulsing of bladder 20f can continue as further distance-indicating bladders 20b, 20c, 20d, and 20e are inflated sequentially. In alternative embodiment, a bladder arrangement including ten bladders arranged in two columns (left and right) of five bladders each can be used in a similar scheme, wherein bladders on the side corresponding to the direction of the turn can be sequentially inflated, or initially inflated and then sequentially deflated, to simultaneously communicate the distance to a turn as well as the direction. In such an embodiment, the uppermost bladder can be pulsed in a similar manner to bladder 20f, as described above, when vehicle 8 is within a predetermined distance to the turn (e.g., 100 ft., 50 ft., or the like).

Figure 10A:
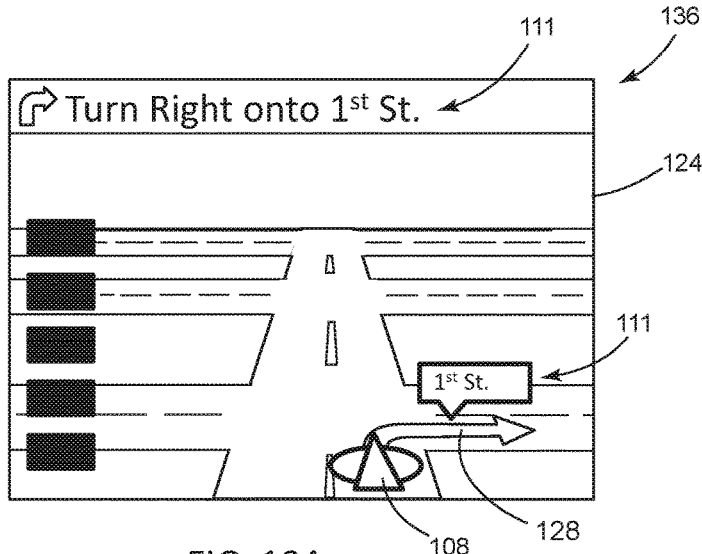
FIG. 10A is a further example depiction of the screen of FIG. 9A providing the route guidance instruction with a change to one component thereof.
Figure 10B:
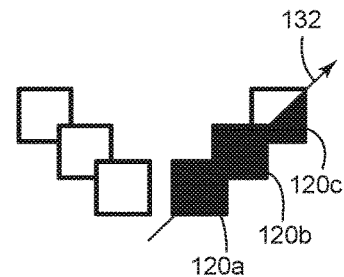
FIG. 10B is a schematic depiction of a subsequent step of the sequence for providing information regarding the components of the route guidance instruction of FIG. 9B.

Turning to FIGS. 9A-10B, an example inflation sequence for indicating a similar route guidance instruction 111 using an arrangement of bladders 120 similar to that depicted in FIGS. 3 and 4 is shown. In such a sequence, both the distance and direction components of the route guidance instruction 111 can be simultaneously indicated using bladders 120a, 120b, and 120c. As shown, the bladder 120a closest to the center 166 on the side 168 corresponding with the direction of the route guidance instruction 111 can be initially inflated to indicate the direction of the route guidance instruction 111 along with the fact that there is still some distance left before the turn is to be executed. In a manner similar to that which is discussed above, the number of bladders extending along diagonal 132 can be scaled to the threshold at which navigation system 10 begins to output specific typographical or verbal instructions related to the next route guidance instruction 111. Accordingly, when the distance to the maneuver corresponding to route guidance instruction 111 reaches, for example half of the initially-indicated value (e.g., 250 feet), bladder 120b can be inflated to indicate that the location of the maneuver is approaching. Within a further threshold distance from the maneuver corresponding with the route guidance instruction 111 is reached, as shown in FIG. 10A, bladder 120c can be pulsed, as shown in FIG. 10B, to indicate that the location for the indicated maneuver is imminent. It is noted that the inflation of bladders 120a and 120b, in particular, can be executed by controller 126 slowly, e.g., over a period of between about 2-20 seconds, or in an example longer than 5 seconds, to further allow the sequential inflation of bladders 120a-120c to provide greater resolution to the distance indication, particularly with fewer bladders 120 used in the overall sequence. In such an example, bladder 120c can be initially inflated in a slow manner over a predetermined time interval (e.g., about 10 seconds) before being pulsed.

It is noted that the arrangement of bladders 220 shown in FIG. 5 can be used in a manner similar to that which is described above with respect to FIGS. 6A-8B or with respect to FIGS. 9A-10B. For example, the bladders 220 closest to center 266 can be inflated sequentially with respect to the depicted diagonals 232a-232e, before using one or more of the outwardly-directed bladders 220 along diagonal 232e to indicate the direction of the corresponding route guidance instruction 11, either with the vertical inflation or after, according to the variations described above.

Figure 7B:
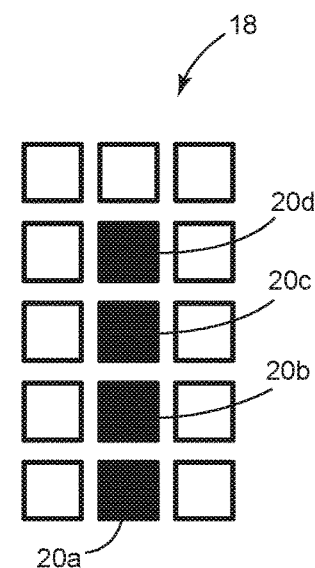
FIG. 7B is a schematic depiction of a subsequent step of the sequence for providing information regarding a component of the route guidance instruction of FIG. 6B.
Figure 11:
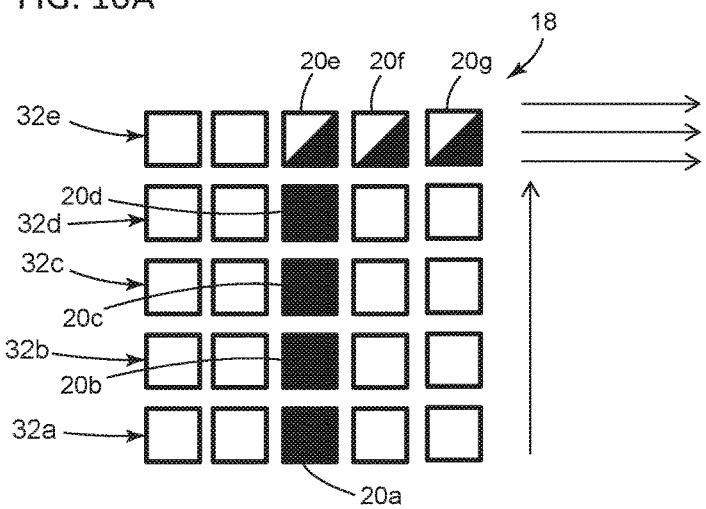
FIG. 11 is a schematic depiction of an alternative sequence for providing information regarding components of a route guidance instruction using a matrix of inflatable bladders within a vehicle seat.

As shown in FIG. 11, a matrix 18 of bladders 20 similar to that shown in FIGS. 6B, 7B, and 8B, but having additional columns of bladders 20 can be used in a similar manner to those discussed above to indicate both distance and direction components of the route guidance instruction 11 (such as that depicted in FIG. 6A). In particular, in the depicted sequence, the distance component can be communicated similarly, by sequentially inflating bladders 20a-20d. The direction component, however, can be indicated by a repeating sequential inflation and deflation of bladders 20e-20g, such as in a rolling manner. These portions of the sequence can be implemented separately, with the direction indication being implemented when the turn is imminent, after inflation of the distance-indicating bladders 20a-20d. Alternatively, the direction indicating bladders 20e-20g can be activated with inflation of bladder 20a, continuing as the additional distance-indicating bladders 20b-20d are inflated. In such a variation, the rolling of bladders 20e-20g can increase in intensity and/or speed as the distance to the location of the indicated maneuver decreases. In particular, the intensity can vary by initially inflating the bladders 20e-20g to less than 100% full and increasing the level of inflation as the distance-to-maneuver decreases.

Figure 12:
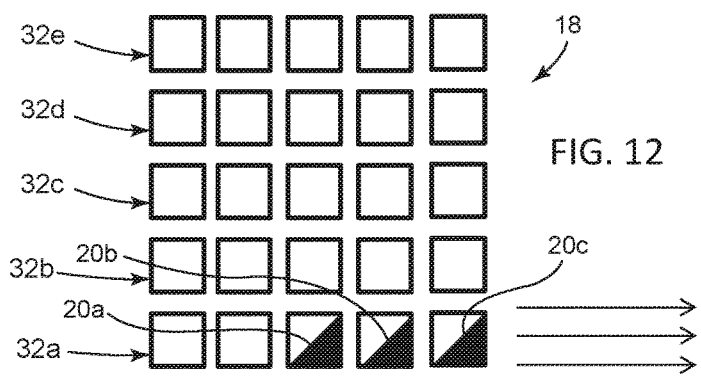
FIGS. 12 and 13 are schematic depictions of steps in an alternative sequence for providing information regarding components of a route guidance instruction using a matrix of inflatable bladders within a vehicle seat.
Figure 13:
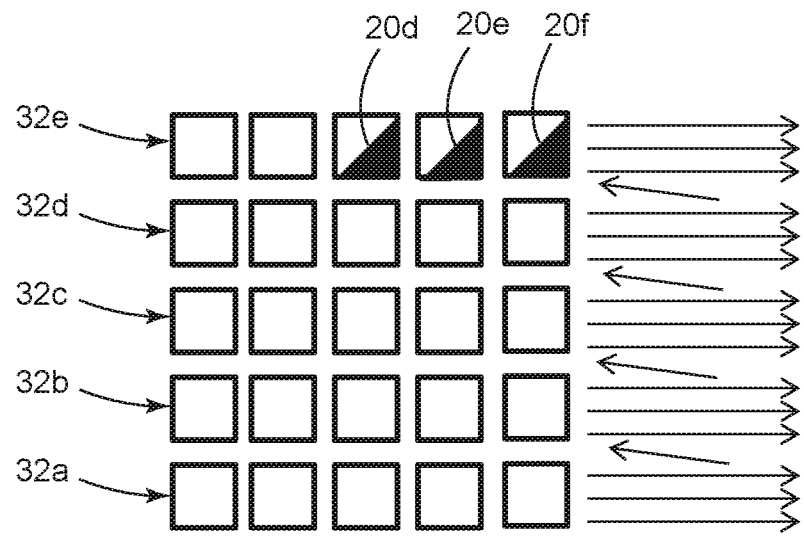

In a further variation, shown in FIGS. 12 and 13, the various rows 32a-32e of bladders 20 can be rolled in an outwardly-moving sequence to simultaneously indicate both the direction and distance to an upcoming maneuver corresponding with the route guidance instruction 11 (such as that shown in FIG. 6A). As shown in FIG. 12, initially the bladders 20 in row 32a can be inflated and deflated in a rolling sequence, with subsequent rows 32b-32d being added or replacing the current row until the location of the maneuver has been reached FIG. 13. It is noted that such a scheme can be implemented along the diagonals 232-232g depicted in the example arrangement of bladders 220 in FIG. 5.

Figure 14:
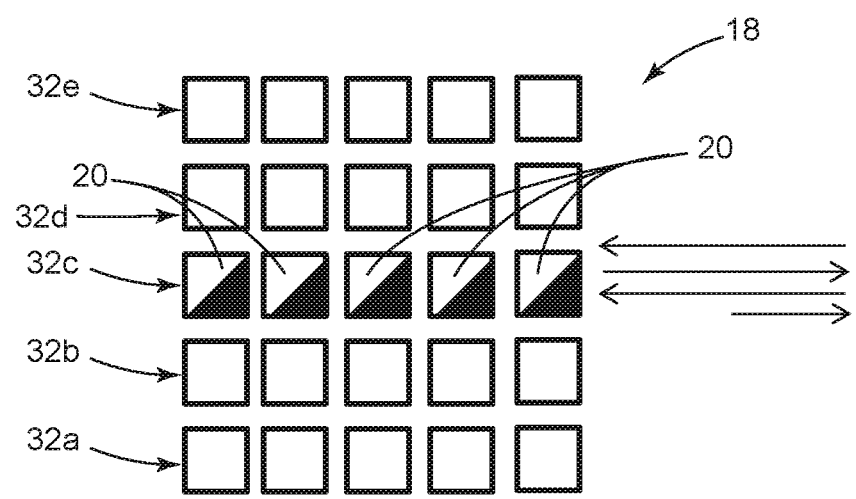
FIG. 14 is a schematic depiction of a sequence for providing additional navigation system information using a matrix of inflatable bladders within a vehicle seat.

Still further, the depicted matrix 18 of bladders 20 can be used to indicate additional information regarding the use of navigation system 10. In one example, when navigation system 10 is in a "rerouting" mode, due to, for example, the actual movement of vehicle 8 deviating from a previously-determined route, controller 26 can, for example, cause bladders 20 to roll in a right-left-right oscillating sequence depicted in FIG. 14. Such a sequence can also be implemented using the bladders 120 depicted in FIGS. 3 and 4 or using selected bladders 220 of those depicted in FIG. 5.

Figure 15A:
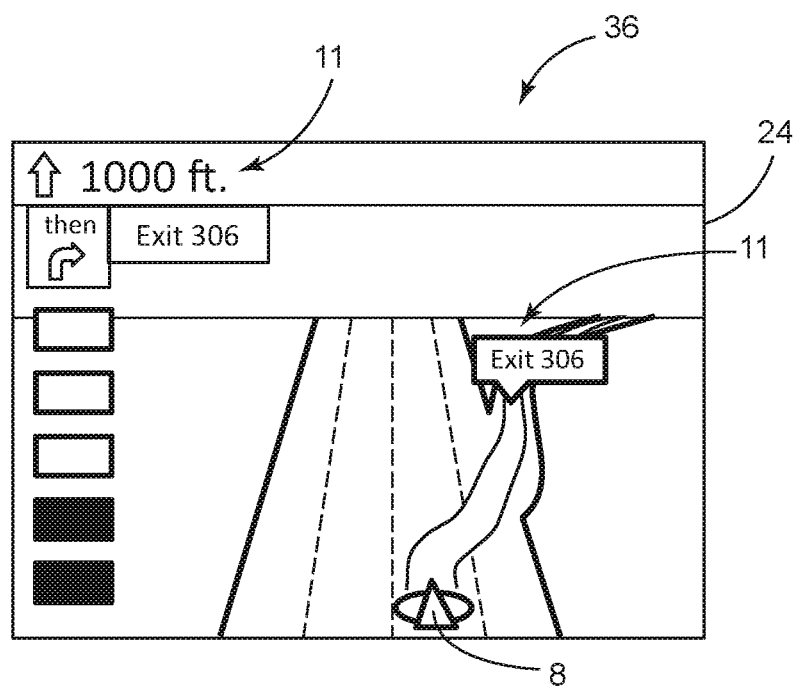
FIG. 15A is a further depiction of a screen included in a vehicle human-machine interface providing an instruction for a preparation maneuver prior to executing a route guidance instruction for navigating the vehicle.
Figure 15B:
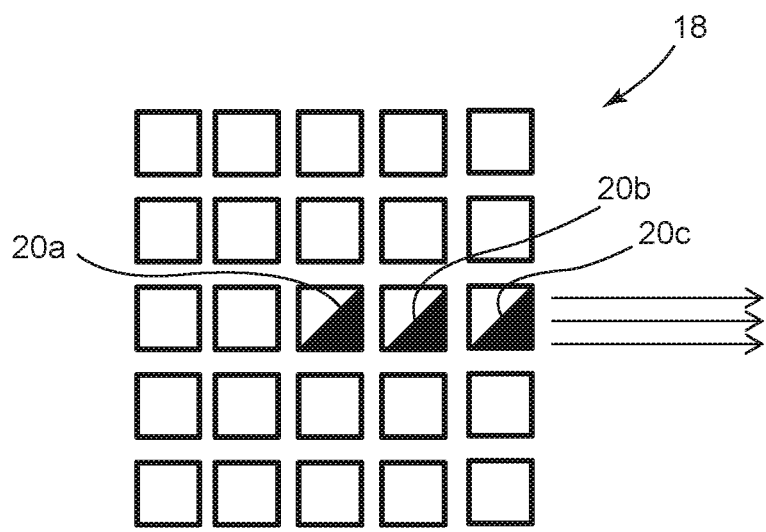
FIG. 15B is a schematic depiction of a sequence for providing information regarding the preparation instruction using a matrix of inflatable bladders within a vehicle seat.

In a further implementation, controller 26 can use selected ones of bladders 20 to indicate an intermediate action needed for the driver to prepare for an upcoming maneuver. As shown in FIG. 15A, for example, if an upcoming maneuver includes taking an exit, but the vehicle 8 is not currently in the lane from which the exit deviates, controller 26 can implement an outwardly-rolling sequence of bladders 20a-20c, as shown in FIG. 15B, which can interrupt a sequence similar to that which is described above in FIGS. 6A and 6B indicating the direction and distance to the exit itself. In a particular example, the speed and/or intensity of the rolling sequence to indicate the needed lane change can be greater than that used in a standard indication sequence to signal the urgency of the needed maneuver.

Figure 16:
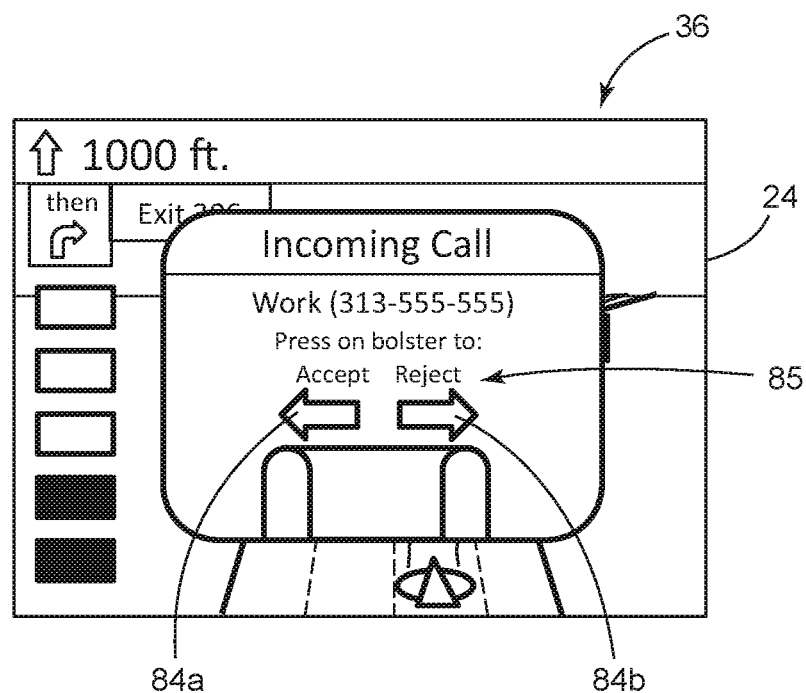
FIG. 16 is a further depiction of a screen included in a vehicle human-machine interface providing selectable menu options that can be selected by an occupant of an associated vehicle seat by pressure on corresponding portions of the seat.

Turning now to FIG. 16, similar inflation and deflation of bladders 20 can be used to indicate various menu options selectable presented to the occupant of seat 12 and to, further, receive a selection of such menu options 84. As shown in FIG. 16, menu options 84a and 84b can be presented to the occupant of seat 12 using display screen 24. An additional message 85 can, optionally, indicate to the user that selection of one of the options 84a, 84b can be respectively selected by applying pressure to one of the seat bolsters 64 or 60 of cushion 40 or seatback 38, respectively. Notably, it may be easier for an occupant to apply pressure to the bolsters 64 of cushion 40 using the occupant's legs, for example. In such an example, in a seat similar to that depicted in FIGS. 1 and 2, the matrix 18 within cushion 40 can extend beneath at least a portion of bolsters 64 such that inflation of the particular ones of bladders 20 beneath bolsters 64 can be perceived by the occupant. Other arrangements are possible, such as the use of individual bladders 20 within bolsters 64 themselves, which can be implemented, for example, in the variations shown in FIGS. 3 and 4 and in FIG. 5. Accordingly, when the menu options 84*a* and 84*b* are presented, bladders 20 located within or adjacent to bolsters 64 can be inflated. Pressure on one of the bolsters 60 or 64 corresponding with the selected menu option 84*a* or 84*b* can be detected by a pressure transducer 86 (FIG. 1) positioned beneath such a bladder 20 or within the particular valve associated therewith (a similar pressure transducer can be oppositely located within seat 12 to correspond with the other selectable menu option 84). A signal resulting from the activation of pressure transducer 86 can, accordingly, be interpreted by controller 26 as a selection of the corresponding option. As illustrated, the depiction of FIG. 16, the selectable menu option 84 can relate to a vehicle function that is outside of the navigation or massage functions of vehicle 8, such as a communication function. Additionally or alternatively, the selectable menu option 84 or options 84 can relate to the massage function (for example, the options to continue or terminate a massage sequence) or a navigation function (such as selection among various alternative routes).

In a further embodiment, a method for assisting a driver in navigating a vehicle can include the general use of the system described above with respect to vehicle 8. In this manner, the method can include determining the above-described set of route guidance instructions, which can be carried out by navigation system 10, as described above. In conjunction with the presentation of verbal instructions and/or the presentation of typographical instructions, as described above, the method can include using navigation data, such as by controller 26, to causing inflation and deflation of selected ones of the plurality of inflatable bladders 20 in seat 12 in a sequential manner, including those given in the various examples above over a predetermined area to indicate one or more components of the at least one route guidance instruction. As discussed above, such components can include the distance to an upcoming maneuver or navigation event and/or a corresponding direction of the maneuver or otherwise relating to the navigation event.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:
1. A vehicle, comprising:
   a navigation system outputting at least one route guidance instruction;
   a vehicle seat having a plurality of inflatable bladders therein and an inflation assembly for selectively inflating and deflating the bladders independently; and
   a controller in communication with the navigation system and with the vehicle seat to cause the inflation assembly to inflate and deflate selected ones of the bladders in a sequential manner:
      over a first predetermined linear area to indicate a direction component of the at least one route guidance instruction, an axis of the linear area extending in generally the same direction as the direction component; and
      over a second predetermined linear area extending in generally the same direction as a distance component included in the route guidance instruction, the selected ones of the bladders in the second predetermined linear area being of a number proportioned relative to the distance component;
   wherein the controller inflates and deflates the selected ones of the bladders proportionally to the distance component within a first group thereof and in generally the same direction as the direction component within a second group thereof.
2. The vehicle of claim 1, wherein:
   the route guidance instruction further includes a distance component; and the selected ones of the bladders in the first predetermined linear area are of a number proportioned relative to the distance component.

3. The vehicle of claim 2, wherein:
the distance component decreases in value as the vehicle moves toward a location upon which the distance component is based; and
the controller at least deflates the selected ones of the bladders in a sequential manner as the distance component decreases.

4. The vehicle of claim 1, further including a screen, wherein:
the navigation system presents the route guidance instruction on the screen, including information regarding the component thereof; and
the controller cause the inflation assembly to inflate and deflate selected ones of the bladders to coordinate with the presentation of the information on the display.

5. The vehicle of claim 1, further including:
a vehicle human-machine interface including a display screen within an interior of the vehicle; and
a pressure transducer positioned within a portion of the vehicle seat;
wherein the human-machine interface presents at least one selectable option on the display screen and is in communication with the pressure transducer to receive a pressure signal therefrom and to interpret the signal as a selection of the selectable option.

6. The vehicle seat of claim 1, wherein the controller further implements a massage sequence using the plurality of bladders.

7. A method for providing navigation information in a vehicle, comprising:
determining at least one route guidance instruction using navigation data;
causing inflation and deflation of selected ones of a plurality of inflatable bladders in a vehicle seat in a sequential manner:
over a first predetermined linear area to indicate a direction component of the at least one route guidance instruction by the predetermined linear area extending generally in the same direction as the direction component, the selected ones of the bladders in the second predetermined linear area being of a number proportioned relative to the distance component; and
over a second predetermined linear area extending in generally the same direction as a distance component included in the at least one route guidance instruction, the selected ones of the bladders in the second predetermined linear area being of a number proportioned relative to the distance component;
wherein the causing inflation and deflation the selected ones of the bladders is done proportionally to the distance component within a first group thereof and in generally the same direction as the direction component within a second group thereof.

8. The method of claim 7, wherein:
the distance component decreases in value as the vehicle moves toward a predetermined location upon which the distance component is based; and
the deflation of the selected ones of the bladders in the sequential manner is carried out to reduce a number of inflated ones of the selected bladders with decreasing of the distance component decreases.

9. The method of claim 7, further including:
presenting the route guidance instruction on a screen so as to include information regarding the component thereof; and
causing an inflation assembly to inflate and deflate selected ones of the bladders to coordinate with the presentation of the information on the display.

10. The method of claim 7, further including:
presenting at least one selectable option on a display screen within the vehicle;
receiving a pressure signal from a pressure transducer positioned within a portion of the vehicle seat; and
interpreting the signal as a selection of the selectable option.

11. The method of claim 10, wherein the pressure transducer is positioned adjacent one of the plurality of inflatable bladders, the method further including:
causing inflation of the one of the plurality of bladders when presenting the at least one selectable option on the display screen.

* * * * *